US012254874B2

United States Patent
Padfield et al.

(10) Patent No.: US 12,254,874 B2
(45) Date of Patent: Mar. 18, 2025

(54) FALSE SUGGESTION DETECTION FOR USER-PROVIDED CONTENT

(71) Applicant: GOOGLE LLC, Mountain View, CA (US)

(72) Inventors: Dirk Padfield, Seattle, WA (US); Noah Murad, Vancouver (CA); Edward Lo, Sunnyvale, CA (US); Bryan Huh, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 406 days.

(21) Appl. No.: 17/676,170

(22) Filed: Feb. 20, 2022

(65) Prior Publication Data

US 2023/0267926 A1    Aug. 24, 2023

(51) Int. Cl.
*G10L 15/187* (2013.01)
*G06F 40/166* (2020.01)
(Continued)

(52) U.S. Cl.
CPC .......... *G10L 15/187* (2013.01); *G06F 40/166* (2020.01); *G10L 15/02* (2013.01);
(Continued)

(58) Field of Classification Search
CPC ..... G10L 15/187; G10L 15/02; G10L 15/063; G10L 15/22; G10L 2015/025; G10L 15/26; G06F 40/166
See application file for complete search history.

(56) References Cited

U.S. PATENT DOCUMENTS

| 10,091,354 B1* | 10/2018 | Boehme | H04M 7/0051 |
| 2007/0083366 A1* | 4/2007 | Peters | G10L 15/26 |
| | | | 704/235 |

(Continued)

FOREIGN PATENT DOCUMENTS

JP    2014077882 A    5/2014

OTHER PUBLICATIONS

Large Scale Deep Neural Network Acoustic Modeling With Semi-Supervised Training Data for Youtube Video Transcription (Year: 2013).*

(Continued)

*Primary Examiner* — Daniel C Washburn
*Assistant Examiner* — Athar N Pasha
(74) *Attorney, Agent, or Firm* — Young Basile Hanlon & MacFarlane, P.C.

(57) ABSTRACT

An automated speech recognition (ASR) transcript of at least a portion of a media content is obtained from an ASR tool. Suggested words are received for corrected words of the ASR transcript of the media content. Features are obtained using at least the suggested words or the corrected words. The features include features relating to sound similarities between the suggested words and the corrected words. The features are input into a machine learning (ML) model to obtain a determination regarding a validity of the suggested words. Responsive to the suggested words constituting a valid suggestion, the suggested words are incorporated into the ASR transcript. At least a portion of the ASR transcript is transmitted to a user device in conjunction with at least a portion of the media content.

20 Claims, 8 Drawing Sheets

(51) Int. Cl.
*G10L 15/02* (2006.01)
*G10L 15/06* (2013.01)
*G10L 15/22* (2006.01)

(52) U.S. Cl.
CPC ............ *G10L 15/063* (2013.01); *G10L 15/22* (2013.01); *G10L 2015/025* (2013.01)

(56) References Cited

U.S. PATENT DOCUMENTS

| | | | |
|---|---|---|---|
| 2007/0118374 A1* | 5/2007 | Wise | G10L 21/06 704/235 |
| 2015/0127346 A1 | 5/2015 | Gruenstein et al. | |
| 2017/0142036 A1* | 5/2017 | Li | H04L 51/04 |
| 2018/0143956 A1 | 5/2018 | Skarbovsky et al. | |
| 2018/0315417 A1 | 11/2018 | Flaks et al. | |
| 2020/0160866 A1* | 5/2020 | Szymanski | G06N 3/02 |
| 2021/0019373 A1* | 1/2021 | Freitag | G06F 40/51 |
| 2021/0142789 A1 | 5/2021 | Gurbani et al. | |
| 2022/0101830 A1* | 3/2022 | Freed | G10L 15/065 |

OTHER PUBLICATIONS

Liao, Hank et al.; "Large Scale Deep Neural Network Acoustic Modeling With Semi Supervised Training Data for Youtube Video Transcription"; IEEE Workshop on Automatic Speech Recognition and Understanding; Dec. 2013; 6 pages.

International Search Report and Written Opinion of International Application No. PCT/US2023/011982 dated Jul. 13, 2023; 26 pages.

Steven Y Feng et al.: "A Survey of Data Augmentation Approaches for NLP", Cornell University Library, Jul. 2, 2021.

Abhishek Sinha et al.: "Negative Data Augmentation" Cornell University Library, Feb. 9, 2021.

* cited by examiner

FALSE SUGGESTION DETECTION FOR USER-PROVIDED CONTENT

TECHNICAL FIELD

This disclosure relates to automated speech recognition and more specifically to detecting whether suggestions for corrections provided by contributors are valid or invalid suggestions.

BACKGROUND

Media (e.g., video) content is increasingly being accessed from content delivery systems, such as video sharing services, over networks (e.g., the Internet). Captions (timed text) are sometimes provided with video content so that certain text appears in association with certain portions of a video content. Captions can serve a number of purposes including making the dialogue in video content understandable to the hearing impaired; making the video content understandable when played in noisy environments such that the audio cannot be heard; and making the video content understandable if the audio of the video content is not understandable due to background noise in the video.

The captions may be generated automatically by an automated speech recognition (ASR) software or service (collectively, an ASR system), which converts a speech signal of a media content into a sequence of words (collectively, a transcript). However, the transcript may include errors. That is, the ASR software or service may erroneously convert certain speech into the wrong text (e.g., words).

SUMMARY

A first aspect is a method that includes obtaining, from an automated speech recognition (ASR) tool, an ASR transcript of at least a portion of a media content; receiving suggested words for corrected words of the ASR transcript of the media content; obtaining features using at least the suggested words or the corrected words, where the features include features relating to sound similarities between the suggested words and the corrected words; inputting the features into a machine learning (ML) model to obtain a determination regarding a validity of the suggested words; responsive to the suggested words constituting a valid suggestion, incorporating the suggested words into the ASR transcript; and transmitting at least a portion of the ASR transcript to a user device in conjunction with at least a portion of the media content.

A second aspect is a method that includes obtaining positive training examples, each positive training example includes a respective correction of corresponding corrected words of a training automated speech recognition (ASR) transcript; obtaining first features using the respective corrections and the corresponding corrected words; obtaining negative training examples, each negative example includes respective corrected words of the training ASR transcript and corresponding randomly generated words constituting suggested replacements for the respective corrected words; obtaining second features using the respective corrected words and the corresponding randomly generated words; and training a machine learning (ML) model using the first features and the second features to identify valid suggestions from invalid suggestions to ASR errors. The first features include features relating to sound similarities between each respective correction and the corresponding corrected words. The second features include features relating to sound similarities between the corresponding corrected words and the corresponding randomly generated words.

A third aspect is a device that includes a memory and a processor. The processor is configured to execute instructions stored in the memory to receive suggested words for corrected words of an automated speech recognition (ASR) transcript of a media content; obtain features using at least the suggested words or the corrected words; and, responsive to a determination based on the features that the suggested words constitute a valid suggestion, incorporate the suggested words into the ASR transcript. The features include a first feature indicating whether the suggested words were considered by the ASR tool as a possible transcription of a sound signal of the media content corresponding to the corrected words, and a second feature indicating a number of times that the suggested words were independently received from other users.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
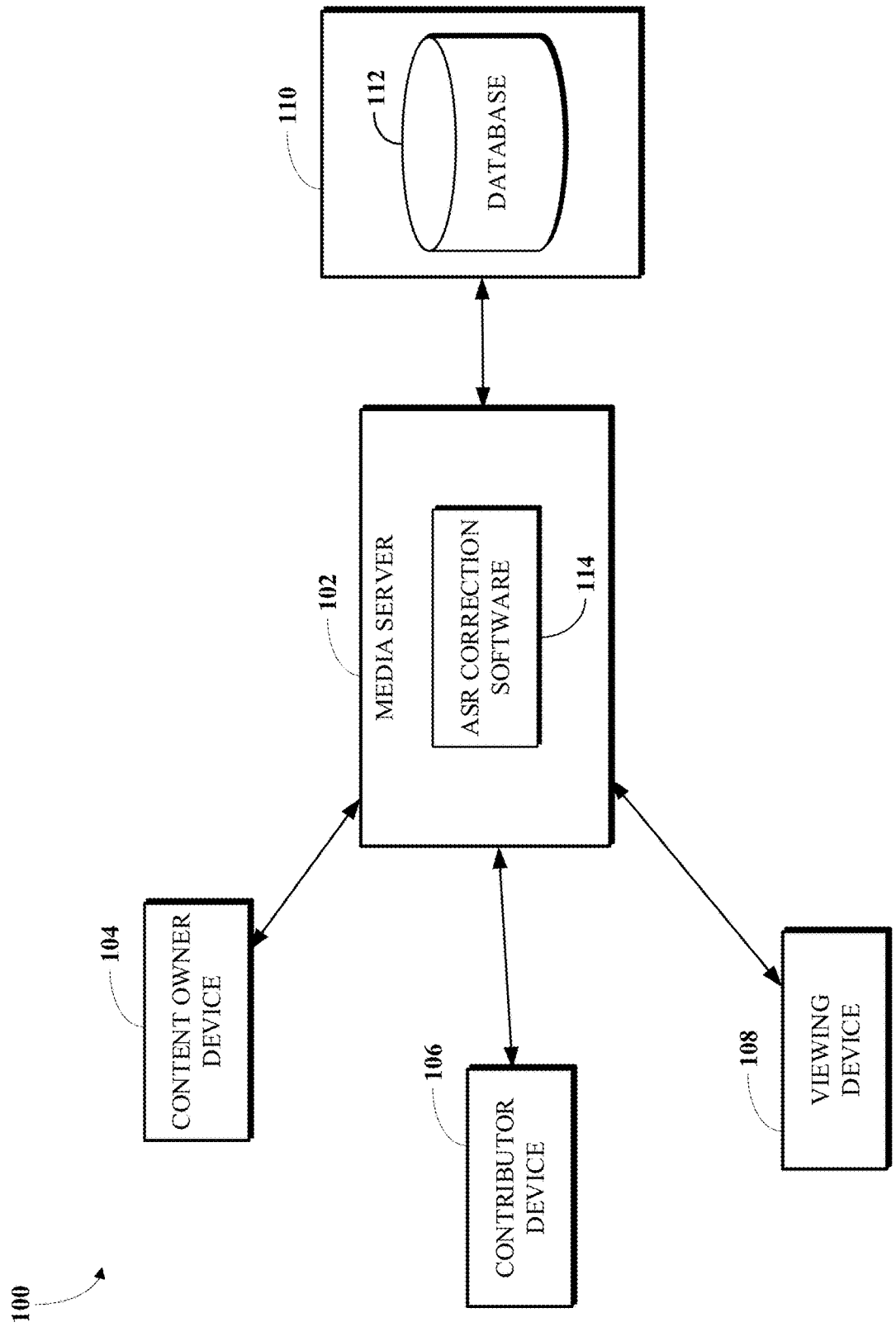
FIG. 1 is a block diagram that illustrates an example of a system for invalid suggestion detection for user-provided content.

While ASR systems have advanced significantly in performance over the past few decades, ASR systems make errors (referred to herein as ASR errors). The errors may be due to several factors including, but not limited to, that an acoustic model used by the ASR system may not be representative of speakers and their potential speech-impacting states (e.g., age, illness, or tiredness), spoken language variabilities (e.g., accents or dialects) between speakers, noise in the media content, or other factors. Insufficient or inadequate training of the ASR systems may be another source of errors. For example, ASR errors may manifest to higher degrees in languages other than English, which generally receives the most research attention and has the largest set of training data. Errors in ASR transcripts (i.e., ASR errors) can lead to user confusion and frustration.

One model for correcting ASR errors is to leverage the wisdom of the crowd, where the collective knowledge and opinions of a group are assumed to be correct. In such a model, a conventional media server may include facilities (e.g., user interfaces, tools, etc.) that enable users (referred to herein as "contributors") to suggest corrections to ASR errors and for other users to vote on the suggestions. A suggestion may be accepted by the media server if the suggestion meets a certain vote threshold. That a suggestion is accepted can include that the suggestion replaces the text that it corrects in the ASR transcript.

In such a model, one contributor may provide an invalid suggestion for a segment of an ASR transcript. An invalid suggestion can be a suggestion that is not correct or accurate. Some other users may not vote for the invalid suggestion based on the correctness (e.g., accuracy) of the suggestion. Rather, they may make subjective assessments based on criteria, other than correctness. Such other criteria may include cuteness, humor, maliciousness, or some other criteria. In a conventional media server, an invalid suggestion that receives sufficient votes (which, again, may be based on subjective criteria other than correctness) may be accepted and incorporated into the transcript of the media content. As such, a contributor may replace some benign text with offensive or nonsensical phrases, and other users may upvote such suggestions causing them to be incorporated into the transcript.

Such a model leads to another problem. As the media server does not recognize that an ASR transcript in fact includes ASR errors or the locations of such ASR errors in an ASR transcript, contributors may provide invalid suggestions for any parts of the ASR transcript even if those parts were not ASR errors. In an example, users may provide inappropriate spellings to accurate ASR transcript content. In another example, users may inject additional text (for example, hyperlinks to inappropriate websites) into the ASR transcript. To illustrate, the ASR transcript may include the accurate fragment "the big bad wolf." However, one contributor may suggest the false correction "the big bad woof," which would replace the accurate fragment if it receives at least a threshold number of votes from other users.

As such, conventional media servers lack the technical capabilities to automatically distinguish between contributor suggestions that are invalid suggestions (e.g., inappropriate, inaccurate, false, or offensive corrections/suggestions) and valid suggestions (e.g., accurate or true corrections/suggestions).

Implementations according to this disclosure use a machine learning (ML) model that are trained to distinguish between valid suggestions and invalid suggestions. The ML model can identify whether suggestions are reasonable (e.g., are valid suggestions) and, as such, can be confidently accepted and incorporated into an ASR transcript. The ML model is trained using examples of what are considered to be valid and accurate corrections and examples of invalid suggestions to learn a surface separation boundary between valid suggestions and invalid suggestions. The ML model can be trained to output a probabilistic score of whether a given text replacement (i.e., a suggestion) is a valid or an invalid suggestion. The ML model can be a neural network, such as a deep learning neural network. The ML model can be any other type of model, such as a linear regression model, a support vector machine (SVN) model, a random forest model, and the like. During the training and the inference phases, the ML model can use other features, as further described below.

Examples of corrections may be readily available. For example, content creators who have provided corrections to ASR transcripts of their user-generated content (UGC) have no incentive to provide invalid corrections. As such, corrections provided by content creators on ASR transcripts of their UGC can be a source of valid suggestions and training data. In some situations, content creators may provide complete transcripts for their content. Such complete transcripts can be used to obtain (e.g., generate) training data of valid suggestions. For example, ASR transcripts can be obtained for media content for which complete caption files were provided by the content creators. Differences between the corresponding caption files and the ASR transcripts can be used as examples of valid suggestions.

On the other hand, there is no good source of negative examples that can be used to train the ML model. Implementations according to this disclosure can use a negative sampling approach to obtain (e.g., generate) negative examples. The negative sampling approach can be summarized as follows. Words or phrases that were corrected in ASR transcripts can be replaced with replacement strings of text that are known to be incorrect (i.e., that differ from the corrections). The replacement strings of text can be randomly sampled from documents, such as ASR transcripts, transcripts provided by content creators, or some other documents. Each such replacement string can be considered a negative example since it does not represent the true fragment that was incorrectly recognized.

To illustrate, assume that the ASR transcript included the phrase "the big bad woof." The content creator may have corrected the phrase to be "the big bad wolf." As such, correcting the "the big bad wolf" can be used as a positive example for "the big bad woof." Assume that the replacement strings "spam field," "Mary went," and "meow" were randomly obtained from other documents. As such, the strings "the big bad spam field," "the big bad Mary went," and "the big bad meow" can be used as negative examples. To reiterate, the words corrected by a human can be replaced by nonsensical words and/or by differently sounding words from the correction words.

The trained ML model can be used to determine (e.g., infer) whether a suggestion provided by a contributor is a valid suggestion or an invalid suggestion. Suggestions determined to be valid can be incorporated into the ASR transcript. Incorporating a suggestion in an ASR transcript can include replacing the corresponding fragment of the ASR with the suggestion. Incorporating a suggestion in an ASR transcript can also include incorporating the suggestion into a copy of the ASR transcript so as not to modify the original ASR transcript. The copy of the ASR transcript can be presented along with the corresponding media content to users viewing the media content.

Further details of invalid suggestion detection for user-provided content are described herein with initial reference to a system in which they can be used or implemented.

FIG. 1 is a block diagram that illustrates an example of a system 100 for invalid suggestion detection for user-provided content. The system 100 is shown as including a media server 102, a content owner device 104, a contributor device 106, a viewing device 108, and a database server 110. Each of the media server 102, the content owner device 104, the contributor device 106, the viewing device 108, and the database server 110 can be, for example, a computing device having an internal configuration of hardware, such as that described with respect to FIG. 2. These computing devices can be communicatively connected, such via one or more networks (not shown).

The media server 102 can be or include more than one physical or virtual servers. The database server 110 can be or include more than one physical or virtual servers. As can be appreciated, many more computing devices than those illustrated (i.e., more than one content owner device, more than one contributor device, and more than one viewer device) may simultaneously access the media server 102. The media server 102 can include an ASR correction software 114, which is further described below. The database server 110 can include a database 112. The database 112 can be one or more database that can include media content, ASR transcripts, ASR corrections, and suggestions.

At a high level, the media server 102 may host media content (e.g., video data), which may be UGC received from content owners via content owner devices (such as the content owner device 104), and transmit media content to viewing devices (such as the viewing device 108), such as in responses to requests for the media content from users (referred to herein as "viewing users") of the viewing devices. The media server 102 may also transmit captions to the viewing devices for display in conjunction with the corresponding portions of the media content. Captions can be obtained from ASR transcripts. Portions (e.g., segments) of the ASR transcripts may be associated with corresponding time windows.

The media content received from the content owner device 104 can be or include any type of media that may include speech signals (e.g., voice data) that may be transcribed using an ASR tool, which may be included in or works in conjunction with the media server 102. As such, the media content can be an audio media content or a video media content that includes speech. An ASR correction software 114 of the media server 102 may include the ASR tool. A user may transmit media content to the media server 102 in any number of ways. In an example, the content owner device 104 may be a handheld device (e.g., a cellular phone) that a user of the content owner device 104 may use to stream content (e.g., a video) to the media server 102. In another example, a user may upload a media content file to the media server 102. The media server 102 may include tools (not shown) for, inter alia, ingesting, encoding, or transcoding of media content.

The media server 102 may obtain (such as from an ASR tool) automated transcripts (referred to herein as ASR transcripts or automated captions) of received media content. Association may be created between an ASR transcript and the corresponding media content in the database 112. As already mentioned, an ASR transcript may include errors. The media server 102 may include software (e.g., the ASR correction software 114) that enables contributors to provide suggestions (suggested corrections) to ASR errors. The ASR correction software 114, which may include the ML model described herein, can be used to evaluate whether a suggestion is a valid suggestion or an invalid suggestion. Valid suggestions can then be incorporated into the ASR transcript. Invalid suggestions can be rejected.

Figure 2:
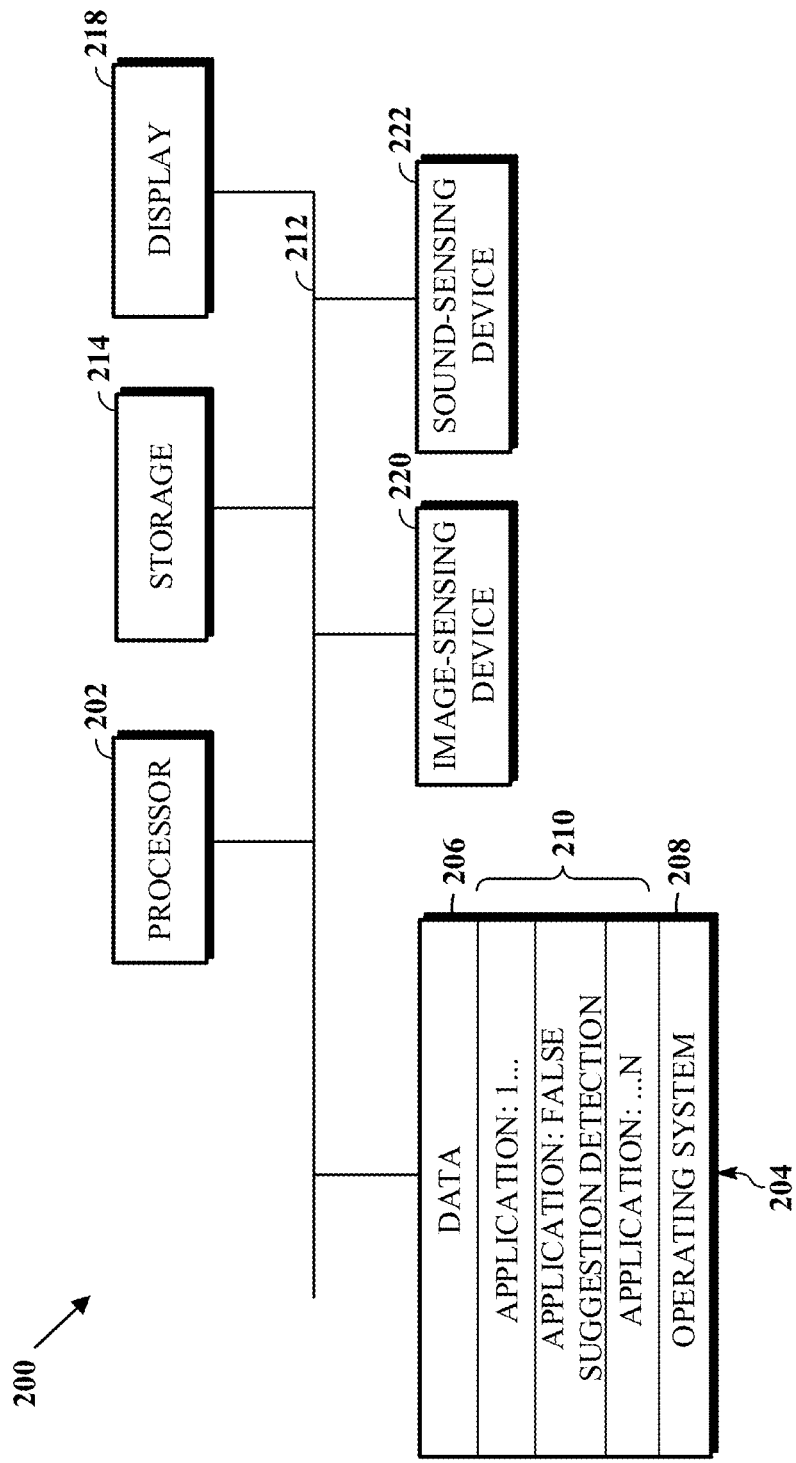
FIG. 2 is a block diagram of an example of a computing device.

FIG. 2 is a block diagram of an example of a computing device 200. The computing device 200 can be in the form of a computing system including multiple computing devices, or in the form of a single computing device, for example, a mobile phone, a tablet computer, a laptop computer, a notebook computer, a desktop computer, a server computer, and the like.

A CPU 202 in the computing device 200 can be a central processing unit. Alternatively, the CPU 202 can be any other type of device, or multiple devices, now existing or hereafter developed, capable of manipulating or processing information. Although the disclosed implementations can be practiced with a single processor as shown (e.g., the CPU 202), advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform techniques and algorithms described herein. For example, the application programs 210 can include applications 1 through N, which further include an application related to false suggestion detection as described herein. For example, the computing device 200 can include an application that enables a contributor to provide suggestions. For example, the computing device may include an application for determining whether a suggestion is valid or invalid and to incorporate a valid suggestion in an ASR transcript. The computing device 200 can also include a secondary storage 214, which can, for example, be a memory card used with a computing device 200 that is mobile.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT) display; or a light-emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
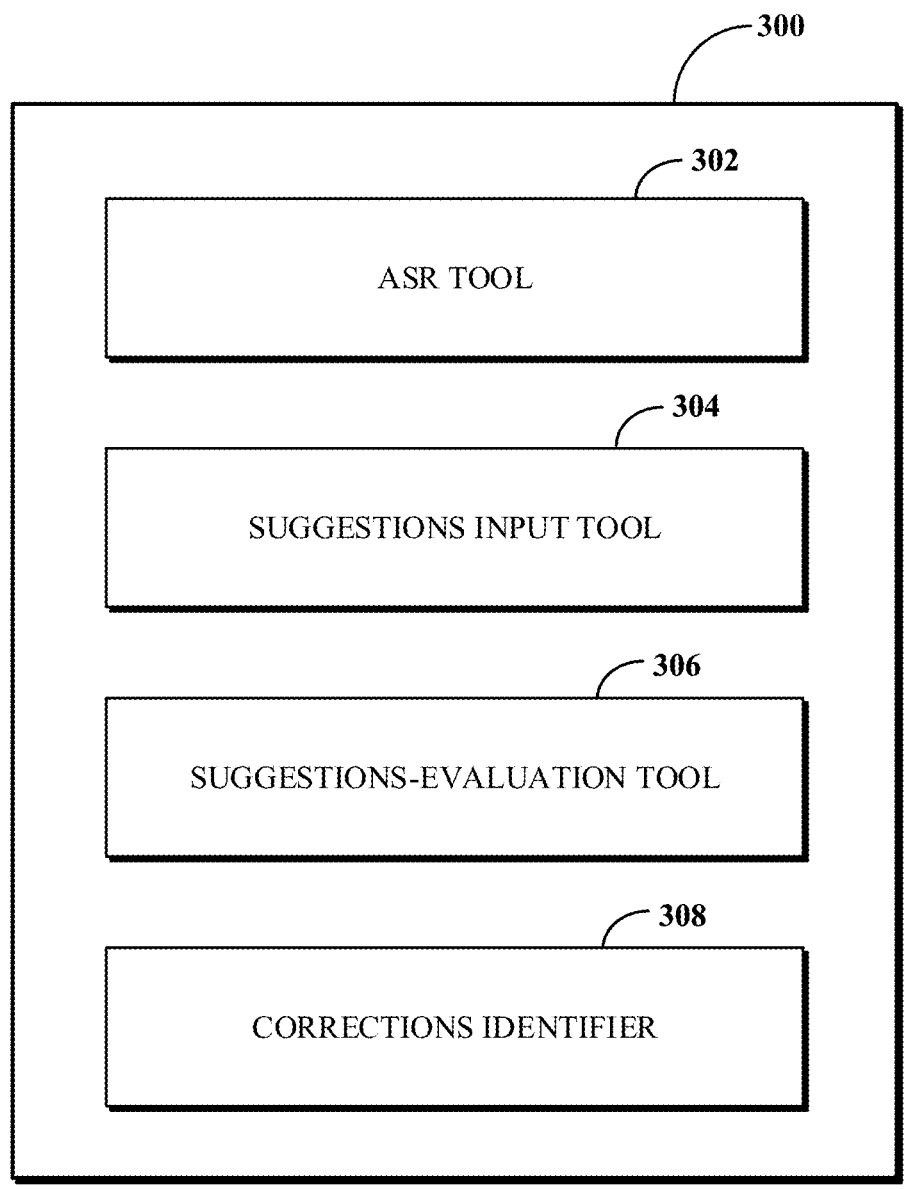
FIG. 3 is a block diagram of example functionality of an ASR correction software.

FIG. 3 is a block diagram of example functionality of an ASR correction software 300, which may be, for example, the ASR correction software 114 shown in FIG. 1. The ASR correction software 300 includes tools, such as programs, subprograms, functions, routines, subroutines, operations, executable instructions, and/or the like for receiving a suggestion for an ASR transcript correction, evaluating the received suggestion, incorporating the suggestion into the ASR transcript or rejecting the suggestion. At least some of the tools can be implemented as respective software programs that may be executed by one or more computing devices, such as the computing device 200 of FIG. 2. A software program can include machine-readable instructions that may be stored in a memory such as the memory 204 or the secondary storage 214, and that, when executed by a processor, such as CPU 202, may cause the computing device to perform the instructions of the software program.

As shown, the ASR correction software 300 includes an ASR tool 302, a suggestions input tool 304, a suggestions-evaluation tool 306, and a corrections identifier 308. In some implementations, the ASR correction software 300 can include more or fewer tools. In some implementations, some of the tools may be combined, some of the tools may be split into more tools, or a combination thereof.

The ASR tool 302 can convert a speech signal of a media content into an ASR transcript (i.e., a sequence of words) that may be presented to viewing users in conjunction with the media content. The ASR transcripts may be stored in an ASR transcripts database, such as the database 112 of FIG. 1.

In obtaining an ASR transcript for a speech signal, the ASR tool 302 may maintain hypotheses of text predictions of the original spoken words. The ASR tool 302 may maintain a number of hypotheses during the prediction process. In an example, the ASR tool 302 may use a beam search technique to maintain (e.g., keep track of) a number (e.g., 10, 20, or some other number) of mappings of portions of the speech to possible textual representations. As speech recognition progresses from the beginning of the speech to the end (e.g., as more speech portions are processed), the ASR tool 302 may prune or add to a lattice of hypotheses (e.g., predictions). The ASR tool 302 may maintain respective scores (probabilities) for the hypotheses. The ASR tool 302 generates one final ASR transcript for a speech signal using, for example, the best predictions (e.g., the predictions corresponding to the highest scores). To illustrate, the speech signal may include the speech signal "I am preparing for another government job" and the ASR tool 302 may maintain the hypotheses "I am preparing for another government job," "I am preparing for undergarment job," "I am preparing for an apartment lob," and "I am preparing for a varment snob."

To reiterate, the ASR tool 302 may maintain a number of alternate hypotheses (predictions) for what are the actual spoken words in portions of the speech signal. The alternate hypotheses are all possible things that could have actually been said by the speaker. The best hypothesis corresponding to a speech portion is added to the ASR transcript. However, it is possible that one of the other hypotheses was in fact the correct word or set of words but, for whatever reason, the ASR tool 302 did not assign the hypothesis a sufficiently high score (probability). In some implementations, and as further described below, the predictions (hypotheses) that are maintained, but not selected, by the ASR tool 302 can be used as input features to the suggestions-evaluation tool 306. As such, at least some of the hypotheses can be maintained (e.g., saved) in a database, such as the database 112 of FIG. 1, for later use in training of the ML model.

The suggestions input tool 304 may receive suggestions for corrections. With respect to an ASR transcript of a media content, the suggestions may be received from the content owner or other contributors. The suggestions received from content owners can be considered as corrections and can be immediately incorporated into the ASR transcript. A suggestion received from a contributor is not incorporated into the ASR transcript unless the suggestions-evaluation tool 306 determines that the suggestion is valid (or, more accurately, that the suggestions is, more likely than not, valid). That is, the suggestions-evaluation tool 306 may determine that a suggestion is valid if the suggestion is determined to meet a validity threshold. The suggestions input tool 304 may present or cause to be presented user interfaces that can be used by users to provide suggestions, such as described with respect to FIG. 4.

The suggestions-evaluation tool 306 determines whether suggestions are valid or invalid. The suggestions-evaluation tool 306 can include an ML model that can be used to determine whether suggestions are valid or invalid. The ML model may be trained and used as described with respect to FIG. 5. That the suggestions-evaluation tool 306 determines that a suggestion is valid can mean, as already mentioned, that the suggestions-evaluation tool 306 determines that the suggestion meets a validity threshold.

In some examples, the ASR correction software 300 can limit the number of corrections that can be made to an ASR transcript. A typical error rate of an ASR tool may be between 5% and 15%. As such, the suggestions-evaluation tool 306 may reject suggestions if the number of corrections of an ASR already exceeds a configured corrections threshold. The correction threshold can be configured to be slightly above or slightly below the expected error rate. As such, if contributors collectively attempt to correct, for example, 50% of an ASR transcript (i.e., 50% of the words in the ASR transcript), then there is a good chance that most of these suggestions are not valid suggestions. As such, assuming that the correction threshold is set of X % (e.g., 10%), if a given ASR transcript includes Y (e.g., 100) words, then the suggestions-evaluation tool 306 would not accept additional suggestions if 10 (100*10%) words have already been corrected. In an example, if the correction threshold is already met, then no features may be obtained, and the ML model is not used to determine whether a suggestion is valid or not.

The corrections identifier 308 identifies corrections as differences between an ASR transcript and a user-provided transcript. For example, the content owner may provide a complete transcript for a UGC. The ASR tool 302 can generate an ASR transcript for the media content. The corrections identifier 308 identifies differences between the ASR transcript and the user-provided transcript. To identify the differences, the corrections identifier 308 may align at least portions of the ASR transcript with portions of the user-provided transcript. The corrections identifier 308 can store the differences in a database, such as the database 112 of FIG. 1.

Figure 4:
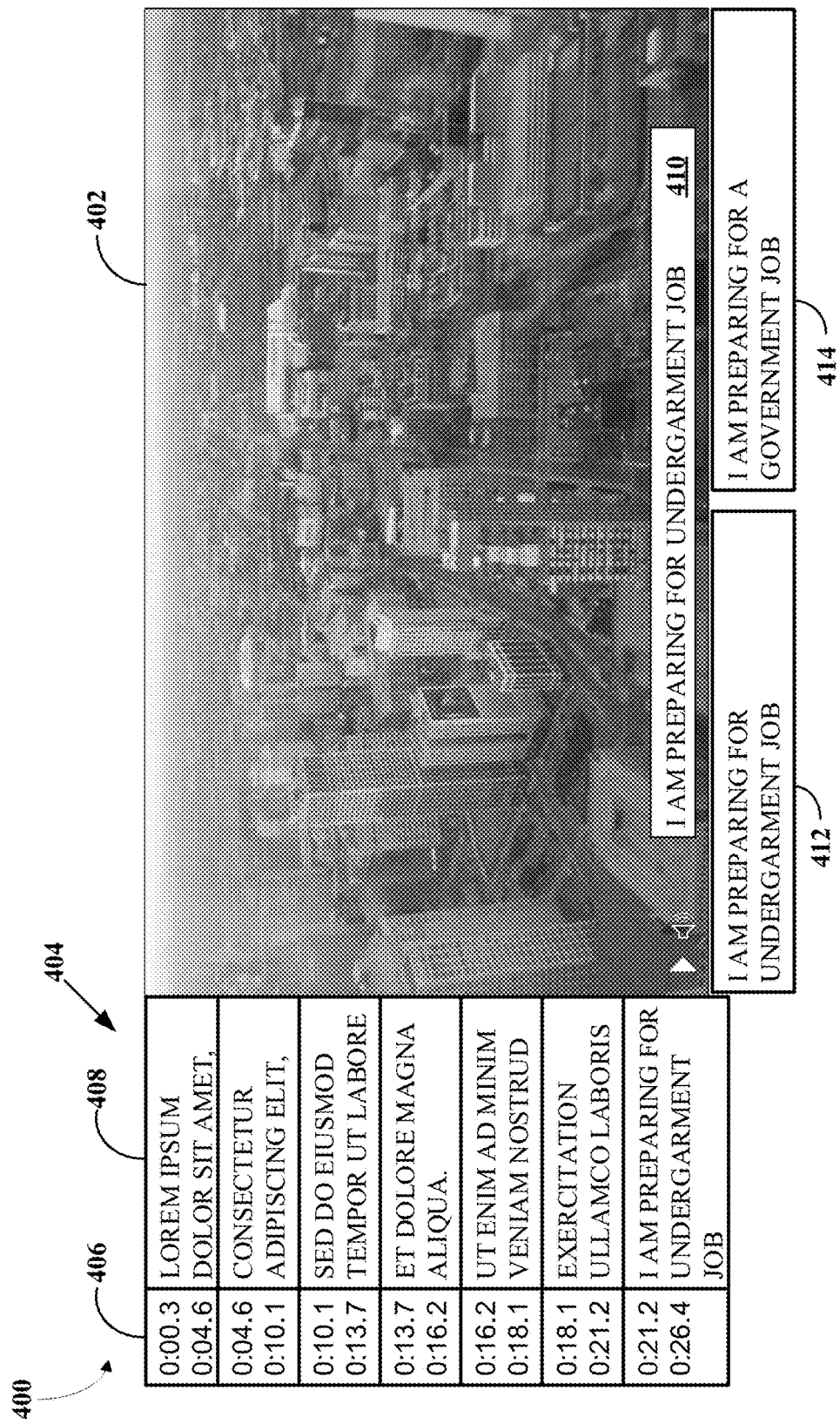
FIG. 4 is an example of a user interface for providing suggestions for ASR errors.

FIG. 4 is an example of a user interface (UI) 400 for providing suggestions for ASR errors. The UI 400 can be presented on a computing device, such as the computing device 200 of FIG. 2. The computing device can be the content owner device 104 or the contributor device 106 of FIG. 1. While one particular arrangement of UI controls and functions are described with respect to FIG. 4, the disclosure is not so limited and other arrangements and functionalities are possible.

A content area 402 of the UI 400 may display a media content (e.g., frames of a video). A captions timeline 404 includes transcript fragments 408 and corresponding timing information. For example, the transcript fragment "CONSECTETUR ADIPISCING ELIT" is to be displayed during the period starting at 0:04.6 seconds and ending at 0:10.1 seconds of the video displayed in the content area 402. A transcript fragment may be a fragment of an original ASR transcript or a corrected ASR fragment. A current transcript fragment 410 includes (e.g., displays) the transcript fragment that is relevant to the current play time of the video. To provide a suggestion, a contributor may pause the video at the position corresponding to the ASR fragment to be corrected. In response to pausing the video, the UI 400 may display the current transcript fragment in an area 412. A user can provide a suggestion in a suggestion area 414.

FIG. 4 illustrates that the user provided the suggestion fragment "I AM PREPARING FOR A GOVERNMENT JOB" for the ASR transcript fragment "I AM PREPARING FOR UNDERGARMENT JOB." In response to receiving the suggestion fragment, the ASR correction software 300 can store the suggestion correction in association with the original ASR fragment in a database, such as the database 112 of FIG. 1. The suggestions input tool 304 may identify and store the specific suggestion as the difference between the original ASR fragment and the suggestion fragment. For example, the suggestions input tool 304 may store that, in the transcript fragment "I AM PREPARING FOR UNDERGARMENT JOB," a suggested correction for "UNDERGARMENT" is "A GOVERNMENT." If the suggestion were received from the content owner, then the suggestions input tool 304 may store that, in the transcript fragment "I AM PREPARING FOR UNDERGARMENT JOB," the fragment "UNDERGARMENT" is corrected with "A GOVERNMENT."

If the suggestion is received from a contributor, the suggestions-evaluation tool 306 of FIG. 3 can be used to identify whether the suggestion is valid or invalid. Here, the suggestion (i.e., the specific suggestion) to be evaluated for validity is the "A GOVERNMENT" as a correction for "UNDERGARMENT."

An ASR transcript may be segmented into fragments according to a speech model used by the ASR tool 302. For example, the ASR tool 302 may break the ASR transcript into fragments based on pauses in the speech, based on timing (such that all fragments correspond, roughly, to the same length of time), or according to some other logical way of partitioning the ASR transcript into fragments. The UI 400 presents fragments as obtained from the ASR tool 302. Additionally, or alternatively, fragments can be selected by contributors in a freeform way. For example, a contributor can select any number of consecutive words in the ASR transcript in order to provide a suggestion therefor.

Figure 5:
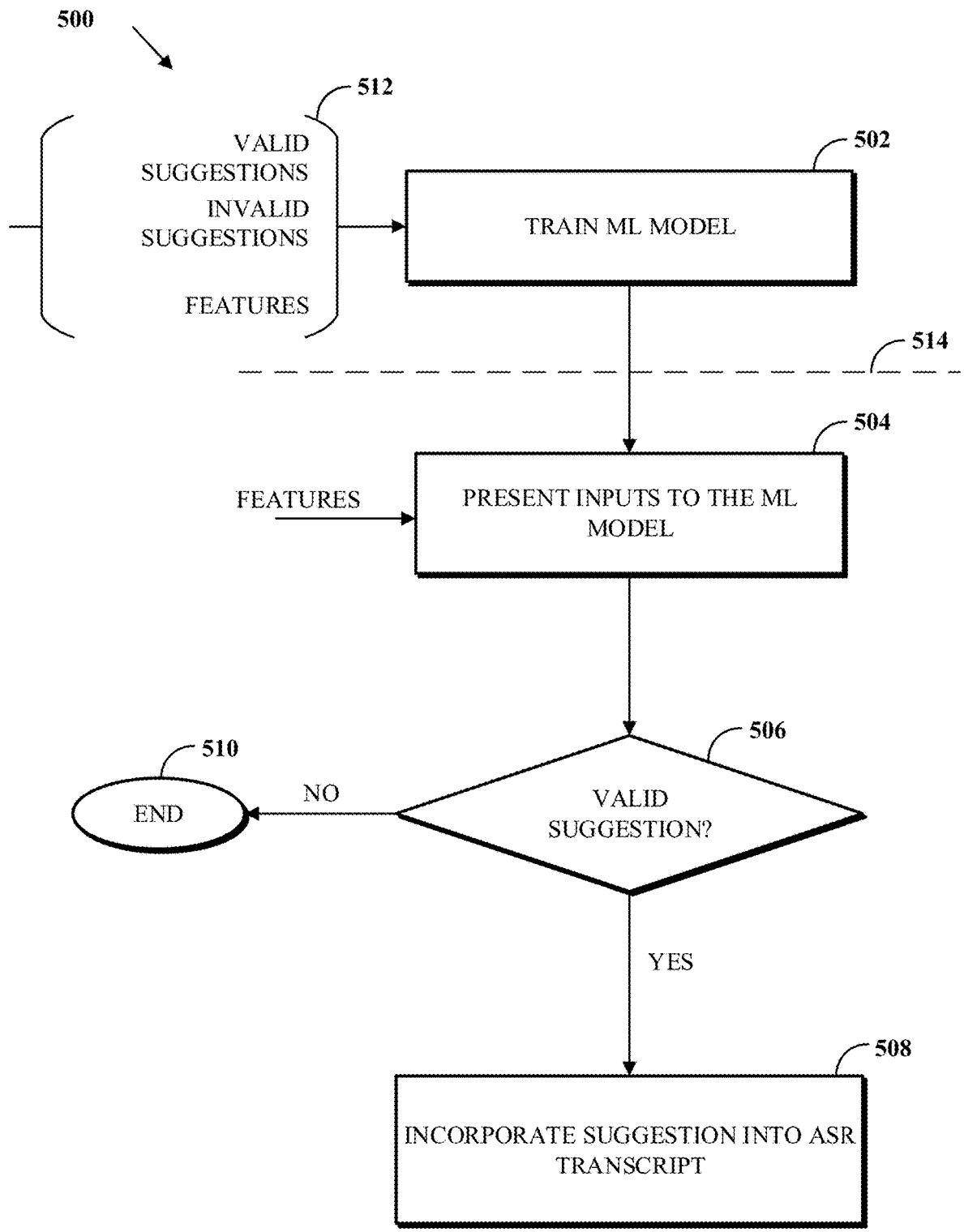
FIG. 5 is a flowchart of a technique for training and using a machine learning model that determines whether suggestions are valid or invalid.

FIG. 5 is a flowchart of a technique 500 for training and using an ML model that determines whether suggestions are valid or invalid. The technique 500 trains, using training data, an ML model to infer whether a suggestion is valid or invalid. The technique 500 then uses the trained ML model to infer whether a suggestion provided by a contributor is valid or invalid.

At 502, the technique 500 trains the ML model. The ML model can be trained using training data 512. Each training datum of the training data 512 can include a positive example (i.e., a suggestion/correction that is known to be valid) or a negative example (a suggestion that is known to be invalid). Each training datum can include additional features as described herein. During the training phase (i.e., at 502), the ML model learns (e.g., trains, builds, derives, etc.) a mapping (e.g., a function) that accepts, as input, a suggestion and other features and output a probabilistic score of whether a suggestion (i.e., a given text replacement) is a valid or an invalid suggestion.

As mentioned above, positive examples can be or can be obtained from corrections or suggestions that are known (or have been confirmed to be) valid corrections. The positive examples may be obtained from the database 112 of FIG. 1. In an example, a content owner can use the UI 400 of FIG. 4 to provide corrections. In another example, positive examples can be obtained as described with respect to the corrections identifier 308 of FIG. 3.

A positive example can include an ASR transcript sequence (e.g., a sequence of one or more words) and its correction sequence (e.g., a sequence of one or more words). The ASR transcript sequence and the correction sequence need not be of the same length (in terms of words or characters). As mentioned, the typical error rate of an ASR tool may be between 5% and 15%. As such, corrections by content owners of ASR errors can provide a rich source of positive examples.

Positive examples can be identified by automatically collecting (such as from the database 112), ASR transcript sequences and their corresponding correction sequences. An ASR transcript sequence and its corresponding correction sequence may be aligned, and differences are considered to be the correction. Aligning an ASR transcript sequence with its corresponding correction sequence is used because the ASR tool may have split one word into multiple words or merged multiple words into one. As such, the number of words in the ASR transcript sequence may differ from the number of words in the correction sequence. Aligning the texts of the ASR transcript sequence and the correction sequence causes words of at least one of the texts to be shifted around such that corresponding words align with each other and the differences can be identified. Any known text-alignment technique can be used to obtain the text alignment, such as techniques based on dynamic programming that determine a best correspondence between two lists of tokens (e.g., words). In an example, the Levenshtein Alignment algorithm can be used.

Particular word(s) of the ASR transcript sequence that are corrected are referred to herein as "corrected words;" and the corresponding word(s) of the correction or suggestion sequence are referred to herein as the "suggested words." To illustrate, if an ASR transcript sequence is "what food did you lunch" and the correction sequence is "hot food during lunch," then the suggested words "hot food during" would be the correction of the corrected words "what food did you;" if an ASR transcript sequence is "talk a trip less vacation" and the correction sequence is "took a triple S vacation," then "took a triple S" would be considered the suggested words of the corrected words "talk a trip less;" and if an ASR transcript sequence is "I am preparing for undergarment job" and the correction sequence is "I am preparing for a government job," then "a government" would be the suggested words of the corrected words "undergarment."

As also already mentioned, negative examples can be obtained from a positive example using a negative sampling approach. A negative example includes an ASR transcript sequence and an incorrect correction sequence. The incorrect correction sequence can be obtained by replacing the corrected words of the ASR transcript sequence with random text (one or more words). More than one negative sample can be obtained from a positive example. To illustrate, using the above example of the ASR transcript sequence "I am preparing for undergarment job," and assuming that 3 negative examples are to be obtained, the following incorrect correction sequences may be used to obtain negative examples: "I am preparing for the big bad job," "I am preparing for Lorem ipsum dolor job," and "I am preparing for total job."

In an example, positive and negative examples can be obtained based on suggestions from contributors. To illustrate, when a media content that has associated corrections is presented to a contributor, the original ASR transcript is presented to a contributor. A suggestion received from a contributor to an ASR transcript sequence can be compared to a corresponding correction (if any) of ASR transcript sequence. If the suggestion does not match the correction, then the suggestion can be considered to be a negative example.

Each training datum can include at least one of acoustic features, natural language processing (NLP) features, acoustic similarity features, or other types of features. While the features are discussed below in the context of the training phase of the ML model, as can be appreciated, the same features that the ML model is trained on are also used during the inference phase.

A set of acoustic features can be based on the respective sounds of the corresponding corrected words and correcting or suggested words of an example. Comparing the sound of the audio of the corrected words to the sound of the suggested words can ensure that the suggested words align with the audio and are not random changes or invalid corrections.

In most cases, the ASR tool generates words that sound very similar to the spoken words. For example, the ASR tool may generate the word "woof" for the word "wolf." An ASR tool would not generate the very differently sounding word "meow" for the spoken word "wolf." As another example, the ASR tool may generate the word "too" for the word "two;" but would not generate the word "seventy" for the word "two." As such, a suggestion that is very differently sounding (e.g., "meow") from a corrected word (e.g., "woof") is likely to be an invalid suggestion. On the other hand, a suggestion that is very similarly sounding (e.g., "wolf") to a corrected word (e.g., "woof") is likely to be valid suggestion.

Any number of techniques can be used to obtain sound-similarity features. In an example, the corrected words and the suggested words can be converted to respective phonemes. The respective phonemes can themselves be used as input features to the ML model. Additionally, or alternatively, a distance measure between the respective phonemes can be used as an input to the ML model. The distance measure can be obtained in any number of ways.

In an example, the phonemes of the corrected words can be obtained from the ASR tool. For example, in addition to outputting the corrected words, the ASR tool can also output the phonemes associated with the corrected words. In another example, the phonemes of the corrected words can be obtained from the corrected words themselves. A text-to-phoneme dictionary may be used to obtain the phonemes of the suggested words. The text-to-phoneme dictionary can also be used to obtain the phonemes of the corrected words, if not obtained from the ASR as described. A Levenshtein projection can be used to align the respective phonemes and obtain a distance measure therefrom.

Obtaining the distance measurement can include performing a similarity weighting for the sounds of phonemes. To illustrate, a higher weight may be assigned to a comparison of the phonemes "pa" and "ba," which sound very similar, than a weight assigned to the phonemes "pa" and "ka," which sounds less similar. In an example, normalization by phrase length can be used. For example, a phrase can be weighted by at the number of words in the phrase, number of tokens in the phrase, a number of phonemes in the phrase, more measures, fewer measures, or a combination thereof.

Additionally, or alternatively, sound-based features can be obtained from the audio signals of the corrected words and the suggested words. The features can be used as inputs to the ML model. Additionally, or alternatively, an audio signal difference score, representing differences (or similarities) between the audio signals can be used as input to the ML model. The audio signal difference score may be a number in the range [0, 1], where higher scores indicate more alignment between the corrected words and the suggested words, or vice versa.

In an example, the sound-based features can be based on spectrograms of the corrected words and the suggested words. The spectrograms can be compared to obtain audio signal difference scores (alternatively or equivalently, similarity scores). The spectrogram of the suggested word can be obtained by converting the suggested words to an audio signal using a text-to-speech tool. In an example, the spectrogram of the corrected words can be obtained from the original audio contained in the media content. In another example, the spectrogram of the corrected words can be obtained using the text-to-speech tool. In an example, signal spectrogram correlation can be measured as a way of aligning the spectrograms and computing the signal difference scores. In another example, a model trained to compare audio sounds to text can be used to obtain the signal difference scores.

Invalid suggestions can be in the form of poor spelling or grammar. To illustrate, a contributor may suggest "take 1 capsule 3 hours before deal" for the ASR transcript sequence "take 1 capsule 3 hours before bed;" and another contributor may suggest "Are you sure you want to exist?" for the ASR transcript sequence "Are you sure you want to exit?"

The quality of such spelling or grammar signals can be used as another set of features to be used as input to the ML model. The features can be based on text alignment between the corrected words and the suggestion words. For example, one or more edit distances can be obtained between the corrected words and the suggested words. The one or more edit distances can be input to the ML model. The edit distance can be a measure of similarity (or, dissimilarity) between the corrected words and the suggested words. The edit distance can be obtained, for example, by counting a minimum number of operations required to transform the corrected words into the suggested words. Any number of techniques or combination of techniques can be used to obtain the edit distance, including, but not limited to, calculating a hamming distance, a Jaccard similarity score, a Jaro-Winkler distance, a Levenshteindistance, a Needleman Wunsch distance, a phonetic distance, and/or some other technique.

Another set of features can be related to a frequency of certain words in the rest of the ASR transcript. For example, if a suggestion contains an inappropriate (e.g., a curse) word or a technical term, it might be reasonable to accept the suggestion if the ASR transcript includes the same suggestion elsewhere; or not accept the suggestion otherwise. Thus, the ML model can learn that a probability of accepting a suggestion should be related to a number of occurrences of the suggestion (or derivations therefrom) in the ASR transcript. That is, a suggestion is likely to be valid if the suggestion fits into the context of the media content. In an example, the number of occurrences may be expressed in terms of, or as a percentage of, the total number of words in the ASR transcript. In another example, the number of occurrences may be expressed in terms of a minimum number of occurrences (e.g., at least 5).

Another set of features can be related to a number of times that a change was independently suggested as a correction by multiple contributors. The confidence that a suggestion is a valid suggestion increases with the number of contributors suggesting the same correction where contributors are independently making suggestions (as opposed to voting on each other's suggestions or showing the suggestions of one contributor to others). As contributors are independently making suggestions, it is unlikely that multiple contributors will independently suggest the same invalid suggestion.

Another set of features can be features obtained using natural language processing (NLP) techniques. For example, context can be used to determine whether the suggested words would result in a well-structured and/or meaningful sentence. For example, a reasonableness score can be obtained for the sentence that includes the suggested words instead of the corrected words. In an example, a first reasonableness score may be obtained for the ASR transcript sequence including the corrected words and a second reasonableness score may be obtained for the ASR transcript sequence but including the suggested words. The first reasonableness score and the second reasonableness score may be, and/or a difference therebetween may be, used as an input to the ML model.

In an example, a Bidirectional Encoder Representations from Transformers (BERT) model can be used to obtain the reasonableness score. The BERT model can be used to determine whether the suggested words result in less meaningful and less well-structured sentence than the original sentence. As is known, a BERT model can be pre-trained on a large data set and then fine-tuned for another purpose using a more specific dataset. Accordingly, a BERT model can be trained using a large corpus of documents to understand context and well-structured and meaningful sentences. The BERT model can be fine-tuned to output a score corresponding to the extent to which suggested words are appropriate for the context. Given a set of words (one or more words), context refers to other words that surround the set of words in a sentence being evaluated by the BERT model. The BERT model may output, for example, one or more scores indicating the extent to which the use of grammar is not correct, the extent to which the use of the suggested words is not reasonable, and the like.

In an example, if suggested words were already considered a possible candidate by the ASR tool, then such suggested words can be given a higher chance of being accepted as a valid suggestion. As such, an input to the ML model can be whether the suggested words were considered by the ASR tool. In an example, the probability assigned by the ASR tool can also be used as an input to the ML model.

The features may be weighed. For example, the ML model may itself learn a weighting of the features. In another example, the weights may be empirically assigned to the different features. The weights can be assigned according to a desired tradeoff between precision and recall.

The ML model can then be used by the technique 500 during an inference phase. The inference phase includes the operations 504-510. A separation 514 indicates that the training phase and the inference phase can be separated in time. The trained ML model can be or can be included in a suggestions-evaluation tool, such as the suggestions-evaluation tool 306 of FIG. 3

The suggestion of a contributor may be received and evaluated. At 504, the suggestion is presented to the trained ML model. One or more of the features described above and corresponding to the features used to train the ML model are obtained and also input to the ML model. At 506, the output of the ML model is evaluated to determine whether the suggestion is to be considered valid or not. In an example, the ML model may output a Boolean (e.g., TRUE/FALSE, 0/1) indicating whether the suggestion is value. In another example, the ML model may output a probabilistic value regarding the validity of the suggestion. If the probabilistic value is greater than a threshold value, then the suggestion is considered valid. If the suggestion is valid, the technique 500 proceeds to 508 to incorporate the suggestion in the ASR transcript. If the suggestion is invalid, the technique 500 ends at 510.

In an example, as the ML model described herein can accurately classify suggested corrections to ASR errors as valid corrections, the ASR errors and their valid corrections can be fed back into a training pipeline (e.g., phase) of the ASR tool, which can lead to better ASR models that generate fewer ASR errors. During the training phase of the ASR tool, the original sound signals that resulted in ASR errors, the ASR errors, and their valid corrections can be used to retrain the ASR tool. Additionally, or alternatively, the ASR errors can be analyzed in conjunction with the corrections to improve the programming (e.g., model) of the ASR tool. As such, the ASR tool and the ASR transcripts obtained therefrom continually improve, which in turn leads to increasingly better user experiences.

In an example, the ASR correction software 300 can be configured with thresholds that tradeoff precision and recall depending on the requirements of ASR correction software 300. For example, if there are many contributors providing suggestions, the ASR correction software 300 may be configured to enforce a high precision so that only text that has a high confidence of being correct is accepted. On the other hand, if there are very few contributors, the system can be configured to induce users to provide suggestions. For example, if only one user provided suggested words for corrected words of an ASR transcript, then when the ASR transcript is presented to viewers, the corrected words may be highlighted (e.g., underlined with a squiggly line) to direct the viewers' attention to the corrected words and induce them to provide suggested words if they thought the corrected words needed correction.

Figure 6:
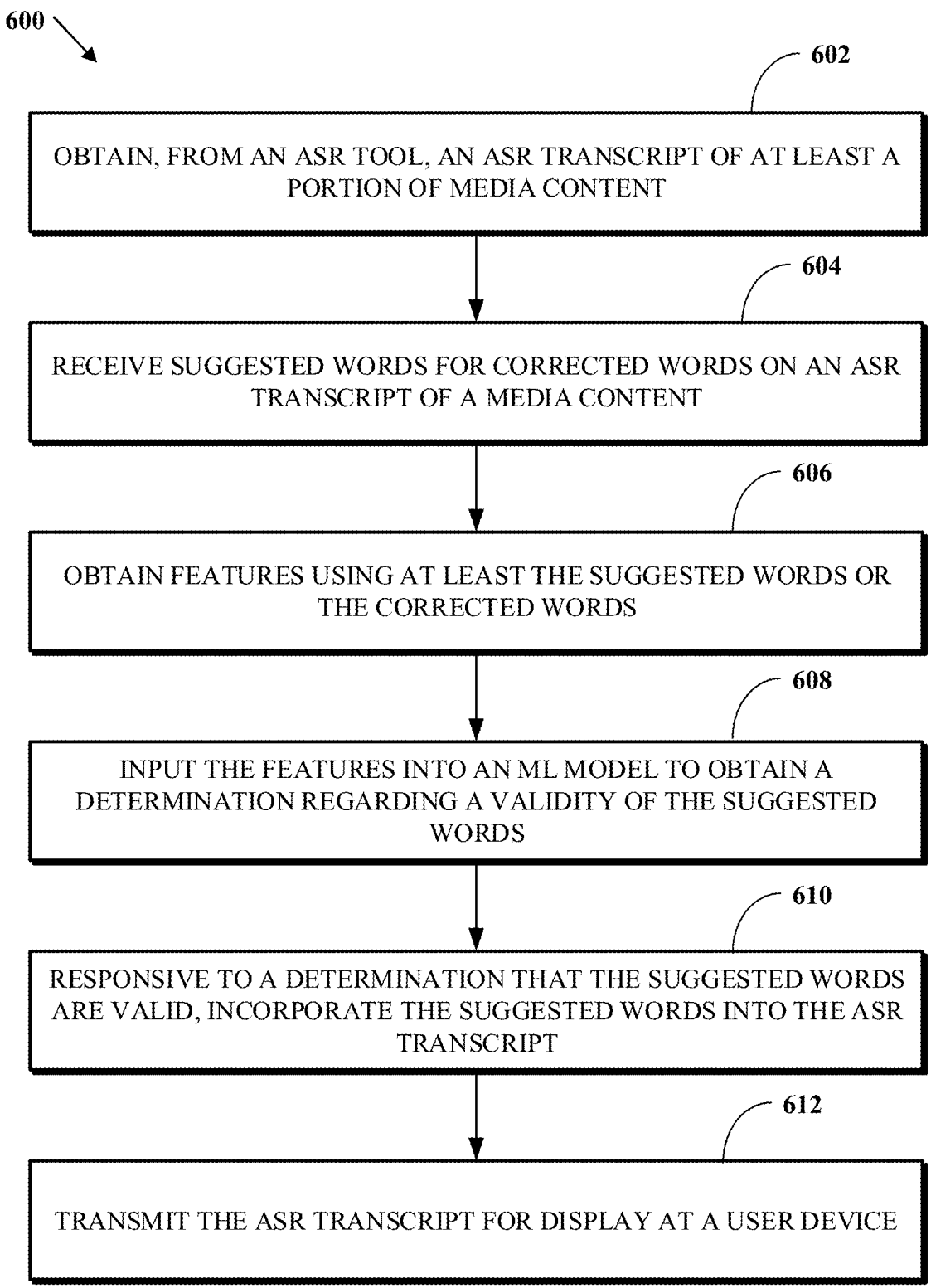
FIG. 6 is a flowchart of an example of a technique for false suggestion detection for user-provided content.

To further describe some implementations in greater detail, reference is next made to examples of techniques which may be performed for false suggestion detection for user-provided content. FIG. 6 is a flowchart of an example of a technique 600 for false suggestion detection for user-provided content. The technique 600 can be executed using computing devices, such as the systems, hardware, and software described with respect to FIGS. 1-5. The technique 600 can be performed, for example, by executing a machine-readable program or other computer-executable instructions, such as routines, instructions, programs, or other code. The steps, or operations, of the technique 600 or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, an ASR transcript is obtained for an ASR tool of at least a portion of a media content. At 604, suggested words for corrected words of the ASR transcript of the media content are received. In an example, the suggested words can be received as described with respect to FIG. 4. As such, the suggested words can be received from a computing device of a contributor. At 606, features are obtained (e.g., calculated, generated, selected) using at least the suggested words or the corrected words. The features can be any one or more of the features described herein. As such, the features can include features relating to sound similarities between the suggested words and the corrected words. The sound similarities can be based on phonemes of the suggested words and phonemes of the corrected words. In an example, the features can include an edit distance between the corrected words and the suggested words. In another example, the features can include a frequency of occurrence of the suggested words in the ASR transcript. In another example, the features can include a number of times that the suggested words are independently received from other users (e.g., contributors). In another example, the features can include whether the suggested words were considered by the ASR tool as a possible transcription of a sound signal of the media content corresponding to the corrected words.

At 608, the features are input into a machine learning (ML) model to obtain a determination regarding a validity of the suggested words. The ML model can be as described above. As such, the ML model can be trained using positive examples that are obtained based on corrections of content owners of the media content. And the ML model can be trained using negative examples that are obtained using negative sampling by replacing corrections of ASR errors with random text strings.

At 610, responsive to the suggested words constituting a valid suggestion, the suggested words can be incorporated into the ASR transcript. That is, the corrected words can be replaced by the suggested words in the ASR transcript. Alternatively, the corrected words can be replaced by the suggested words in a copy of the ASR transcript. At 612, at least a portion of the ASR transcript is transmitted to a user device in conjunction with at least a portion of the media content. The portion of the ASR transcript can be displayed as timed captions in conjunction with the display of the portion of the media content. To be clear, transmitting the transcript means transmitting a version of the ASR transcript (either the ASR transcript itself or the copy thereof) including the suggested words (if the suggested words were incorporated into the ASR transcript).

In an example, even if the suggestion is valid, the suggestion may not be incorporated into the ASR transcript if a number of corrections to the ASR transcript exceeds a corrections threshold, as described above. The corrections threshold can be a percentage of the number of words in the ASR transcript.

In an example, the technique 600 can further include using the suggested words and the corrected words to retrain the ASR tool. As described above, the classification results of the ML model (and more specifically, the suggested words determined by the ML model to be valid suggestions) can be used to retrain the ASR tool.

Figure 7:
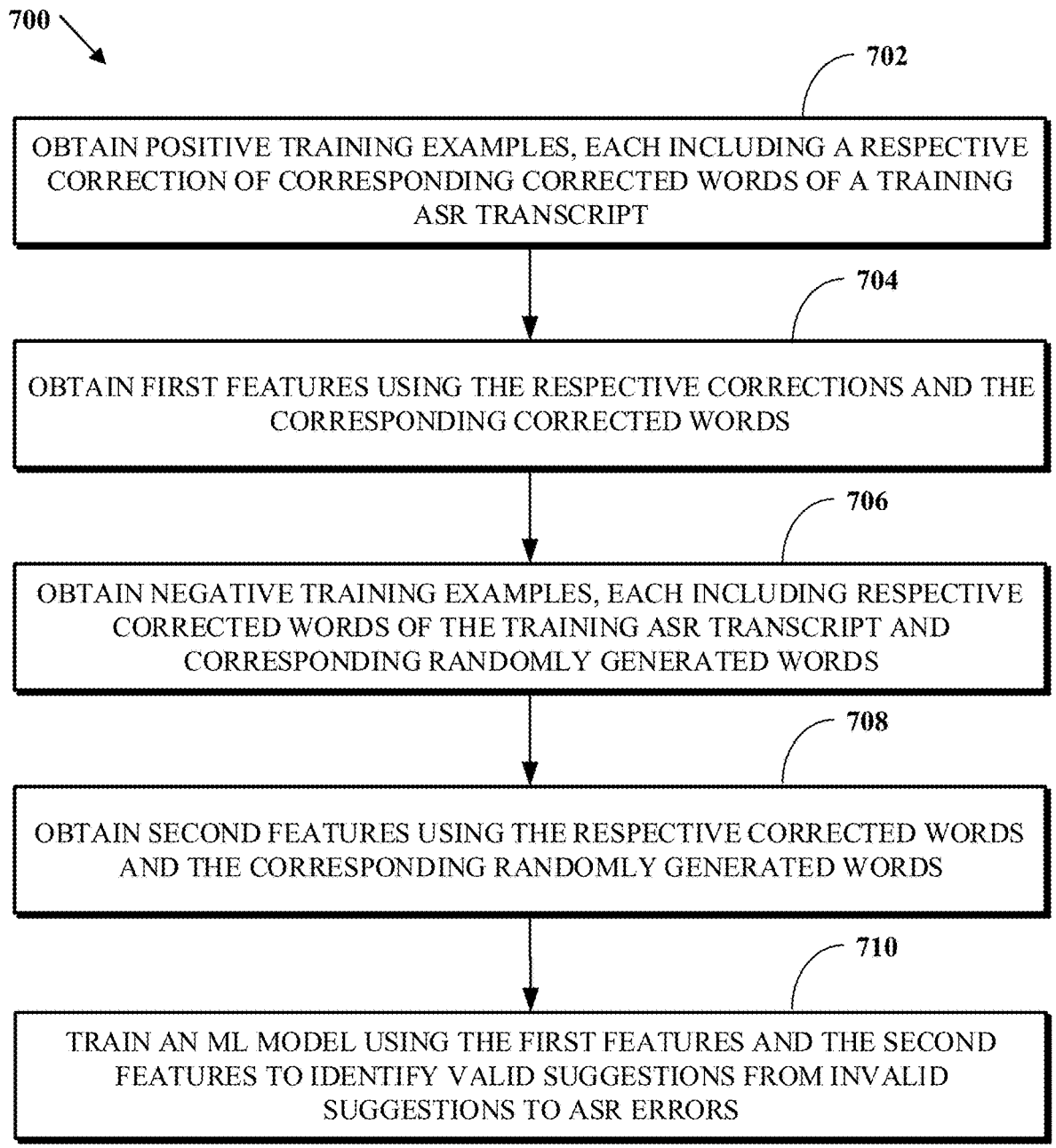
FIG. 7 is a flowchart of an example of a technique for training a machine learning model to detect false suggestions for user-provided content.

FIG. 7 is a flowchart of an example of a technique 700 for training a machine learning model to detect false suggestions for user-provided content. The technique 700 can be executed using computing devices, such as the systems, hardware, and software described with respect to FIGS. 1-5. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, the positive training examples are obtained, as described above. As such, each positive training example includes a respective correction of corresponding corrected words of a training automated speech recognition (ASR) transcript. At 704, first features are obtained using the respective corrections and the corresponding corrected words. The features can be obtained as described above. As such, the first features can include features relating to sound similarities between each respective correction and the corresponding corrected words.

At 706, negative training examples are obtained, as described above. As such, each negative example can include respective corrected words of the training ASR transcript and corresponding randomly generated words constituting suggested replacements for the respective corrected words. At 708, second features are obtained using the respective corrected words and the corresponding randomly generated words. The second features can be obtained as described above. As such, the second features can include features relating to sound similarities between the corresponding corrected words and the corresponding randomly generated words. At 710, an ML model is trained using the first features and the second features to identify valid suggestions from invalid suggestions to ASR errors, as described above. In an example, the sound similarities between the respective correction and the corresponding corrected words can be based on phonemes of the respective correction and phonemes of the corresponding corrected words.

In an example, the first features can include a first edit distance between the respective correction and the corresponding corrected words, and the second features can include a second edit distance between the corresponding corrected words and the corresponding randomly generated words. In an example, the second features can include a frequency of occurrence of the corresponding randomly generated words in the training ASR transcript.

The technique 700 can further include receiving a media content. An ASR transcript for the media content is obtained from an ASR tool. Suggested words for corrected words of the ASR transcript of the media content are received, such as from a contributor device of a contributor. Responsive to a determination obtained from the ML model indicating that the suggested words constitute a valid suggestion, the suggested words can be incorporated into the ASR transcript. In an example, the suggested words can be incorporated into the ASR transcript on a condition that a number of corrections to the ASR transcript not exceeding a corrections threshold.

In another aspect of the disclosed implementations, the features used to train an ML model to determine, and to use the ML model to infer, whether suggested words constitute a valid suggestion can include a first feature indicating whether the suggested words were considered by the ASR tool as a possible transcription of a sound signal of the media content corresponding to the corrected words and a second feature indicating a number of times that the suggested words were independently received from other users. The features can further include an edit distance between the corrected words and the suggested words and a frequency of occurrence of the suggested words in the ASR transcript.

Figure 8A:
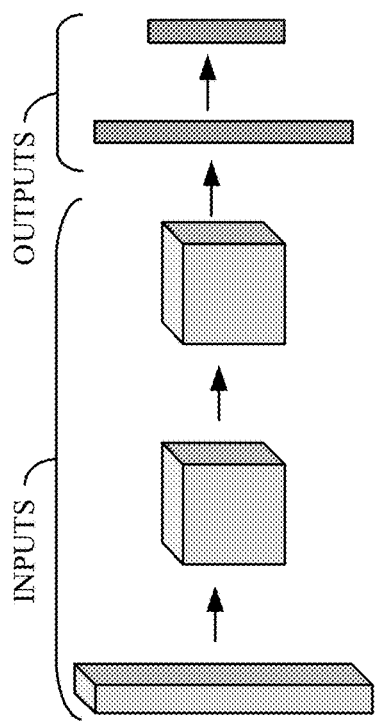
FIGS. 8A-8B are block diagrams of examples of convolutional neural networks (CNNs).
Figure 8B:
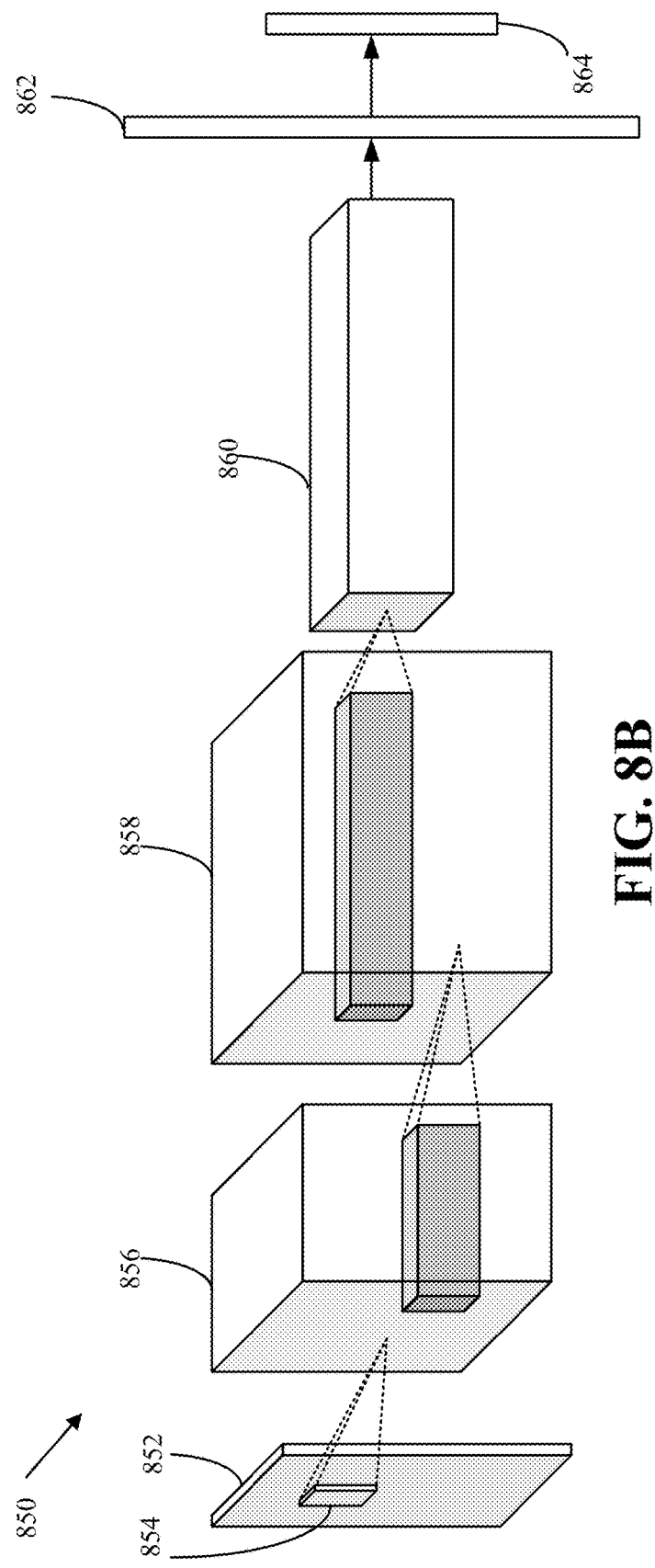

As mentioned above, an ML model for detecting whether suggestion words constitute a valid suggestion can be a neural network, such as convolution neural network. FIGS. 8A-8B are block diagrams of examples of convolutional neural networks (CNNs) 800 and 850 for false suggestion detection.

FIG. 8A illustrates a high-level block diagram of an example 800 of a typical CNN network, or simply a CNN. In a CNN, a feature extraction portion typically includes a set of convolutional operations, which is typically a series of filters that are used to filter an input signal based on a filter. For example, and in the context of false suggestion detection, these filters can be used to identify salient aspects of the features used as inputs to the ML model and which are useful in separating valid from invalid suggestions. As the number of stacked convolutional operations increases, later convolutional operations can find higher-level features.

In a CNN, a classification portion is typically a set of fully connected (FC) layers, which may also be referred to as dense operations. The fully connected layers can be thought of as looking at all the input features in order to generate a high-level classifier. Several stages (e.g., a series) of high-level classifiers eventually generate the desired classification output.

As mentioned, a typical CNN network is composed of a number of convolutional operations (e.g., the salient feature- or aspect-extraction portion) which may be followed by a number of fully connected layers. The number of operations of each type and their respective sizes is typically determined during the training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the features-extraction portion) and/or the fully connected operation (i.e., in the classification portion). The fully connected layers may be referred to as Dense operations. As a person skilled in the art recognizes, a convolution operation can use a SeparableConvolution2D or Convolution2D operation.

As used in this disclosure, a convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN is reached. Similarly, a Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

In a typical CNN, each of the convolution layers may consist of a set of filters. While a filter may be applied to a subset of the input data at a time, the filter may be applied across the full input, such as by sweeping over the inputs. The operations performed by this layer are typically linear/matrix multiplications. The output of the convolution filter may be further filtered using an activation function. The activation function may be a linear function or non-linear function (e.g., a sigmoid function, an arcTan function, a tan H function, a ReLu function, or the like).

Each of the fully connected operations is a linear operation in which every input is connected to every output by a weight. As such, a fully connected layer with N number of inputs and M outputs can have a total of N×M weights. As mentioned above, a Dense operation may be generally followed by a non-linear activation function to generate an output of that layer.

Some CNN network architectures may include several feature extraction portions that extract features at different granularities and a flattening layer (which may be referred to as a concatenation layer) that receives the output(s) of the last convolution layer of each of the extraction portions. The flattening layer aggregates all the features extracted by the different feature extraction portions into one input set. The output of the flattening layer may be fed into (i.e., used as input to) the fully connected layers of the classification portion.

FIG. 8B illustrates a high-level block diagram of an example of a CNN 850. In CNNs such as the CNN 850, convolutional layers are used for extracting features and fully connected layers are used as the classification layers.

In the CNN 850, inputs 852 may be partitioned into smaller portions 854 that can be fed through (e.g., input to, etc.) one or more convolutional layers (e.g., convolutional layers 856 and 558), one or more max pooling layers (e.g., a pooling layer 860), and one or more fully connected layers (e.g., fully connected layers 862) to produce an output at an output layer 864. In an example, the features described above can be vectorized for input to the CNN 850. The output of the output layer 864 can be an indication (a Boolean, a probability, etc.) indicating whether suggested words constitute a valid suggestion. The output can also include a probability value indicating a confidence level that the suggested words are a valid suggestion. However, in other examples, other outputs (or output formats) are possible.

For simplicity of explanation, the techniques 500, 600, and 700, of FIGS. 5, 6, and 7, respectively, are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The words "example" or "implementation" are used herein to mean serving as an example, instance, or illustration. Any aspect or design described herein as "example" or "implementation" is not necessarily to be construed as being preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise or clearly indicated otherwise by the context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form. Moreover, use of the term "an implementation" or "one implementation" throughout is not intended to mean the same embodiment or implementation unless described as such.

Implementations of the media server 102 (and the algorithms, methods, instructions, etc., stored thereon and/or executed thereby, including by ASR correction software 300) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, in one aspect, for example, the media server 102 can be implemented using a general-purpose computer or general-purpose processor with a computer program that, when executed, carries out any of the respective methods, algorithms, and/or instructions described herein. In addition, or alternatively, for example, a special-purpose computer/processor, which can contain other hardware for carrying out any of the methods, algorithms, or instructions described herein, can be utilized.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
    obtaining, from an automated speech recognition (ASR) tool, an ASR transcript of at least a portion of a media content;
    receiving, from a user, a suggested word for a corrected word of the ASR transcript of the media content;
    obtaining features using at least the suggested word or the corrected word, wherein the features include features relating to sound similarities between the suggested word and the corrected word and a count of how many times the suggested word was received as a correction for the corrected word from different users;
    inputting the features into a machine learning (ML) model to obtain a determination regarding a validity of the suggested word;
    responsive to the suggested word constituting a valid suggestion, incorporating the suggested word into the ASR transcript; and
    transmitting at least a portion of the ASR transcript to a user device in conjunction with at least a portion of the media content.

2. The method of claim 1, wherein the features further include an edit distance between the corrected word and the suggested word.

3. The method of claim 1, wherein the features obtained using the at least the suggested word or the corrected word further include a frequency of occurrence of the suggested word in the ASR transcript, further comprising:
    inputting the frequency of occurrence of the suggested word in the ASR transcript into the ML model.

4. The method of claim 1, wherein the sound similarities is based on phonemes of the suggested word and phonemes of the corrected word.

5. The method of claim 1, wherein the features further include whether the suggested word was considered by the ASR tool as a possible transcription of a sound signal of the media content corresponding to the corrected word.

6. The method of claim 1, wherein the ML model is trained using positive examples obtained based on corrections of content owners of the media content.

7. The method of claim 6, wherein the ML model is trained using negative examples obtained using negative sampling by replacing corrections of ASR errors with random text strings.

8. The method of claim 1, further comprising:
    using the suggested word and the corrected word to retrain the ASR tool.

9. The method of claim 1, wherein incorporating the suggested word into the ASR transcript comprises:
    incorporating the suggested word into the ASR transcript on a condition that a number of corrections to the ASR transcript does not exceed a corrections threshold.

10. A device, comprising:
    a memory; and
    a processor, the processor configured to execute instructions stored in the memory to:
        receive, from users, suggested words for corrected words of an automated speech recognition (ASR) transcript of a media content;
        obtain features using at least the suggested words or the corrected words, wherein the features include:
            a first feature indicating whether the suggested words were considered by the ASR tool as a possible transcription of a sound signal of the media content corresponding to the corrected words; and a second feature indicating a number of times that the suggested words were independently received as a correction for the corrected word from other users; and responsive to a determination based on the features that the suggested words constitute a valid suggestion, incorporate the suggested words into the ASR transcript.

11. The device of claim 10, wherein the features further include an edit distance between the corrected words and the suggested words and a frequency of occurrence of the suggested words in the ASR transcript.

12. The device of claim 10, wherein the instructions to incorporate the suggested words into the ASR transcript comprise instructions to:
  incorporate the suggested words into the ASR transcript on a condition that a number of corrections to the ASR transcript does not exceed a corrections threshold.

13. One or more non-transitory computer readable media storing instructions operable to cause one or more processors to perform operations comprising:
  obtaining, from an automated speech recognition (ASR) tool, an ASR transcript of at least a portion of a media content;
  receiving, from a user, a suggested word for a corrected word of the ASR transcript of the media content;
  obtaining features using at least the suggested word or the corrected word, wherein the features include features relating to sound similarities between the suggested word and the corrected word and a count of how many times the suggested word was received as a correction for the corrected word from different users;
  inputting the features into a machine learning (ML) model to obtain a determination regarding a validity of the suggested word;
  responsive to the suggested word constituting a valid suggestion, incorporating the suggested word into the ASR transcript; and
  transmitting at least a portion of the ASR transcript to a user device in conjunction with at least a portion of the media content.

14. The one or more non-transitory computer readable media of claim 13, wherein the features further include an edit distance between the corrected word and the suggested word.

15. The one or more non-transitory computer readable media of claim 13, wherein the features further include a frequency of occurrence of the suggested word in the ASR transcript.

16. The one or more non-transitory computer readable media of claim 13, wherein the sound similarities is based on phonemes of the suggested word and phonemes of the corrected word.

17. The one or more non-transitory computer readable media of claim 13, wherein the features further include whether the suggested word was considered by the ASR tool as a possible transcription of a sound signal of the media content corresponding to the corrected word.

18. The one or more non-transitory computer readable media of claim 13, wherein the ML model is trained using positive examples obtained based on corrections of content owners of the media content.

19. The one or more non-transitory computer readable media of claim 18, wherein the ML model is trained using negative examples obtained using negative sampling by replacing corrections of ASR errors with random text strings.

20. The one or more non-transitory computer readable media of claim 13, wherein incorporating the suggested word into the ASR transcript comprises:
  incorporating the suggested word into the ASR transcript on a condition that a number of corrections to the ASR transcript does not exceed a corrections threshold.

* * * * *